June 29, 1937.  J. G. QUINLIVAN  2,085,390
AIR COOLER AND HUMIDIFIER
Filed Nov. 4, 1936
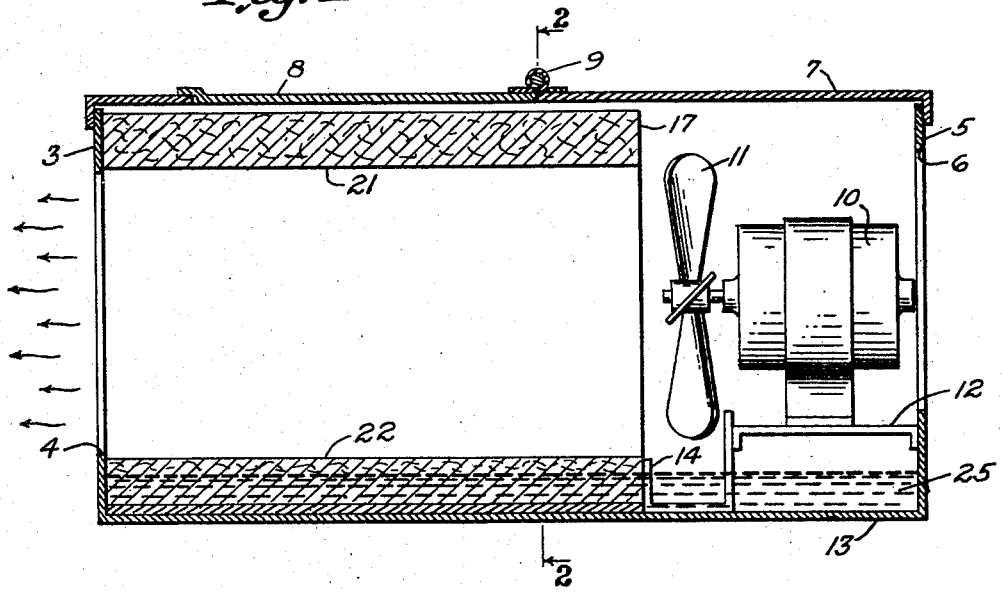
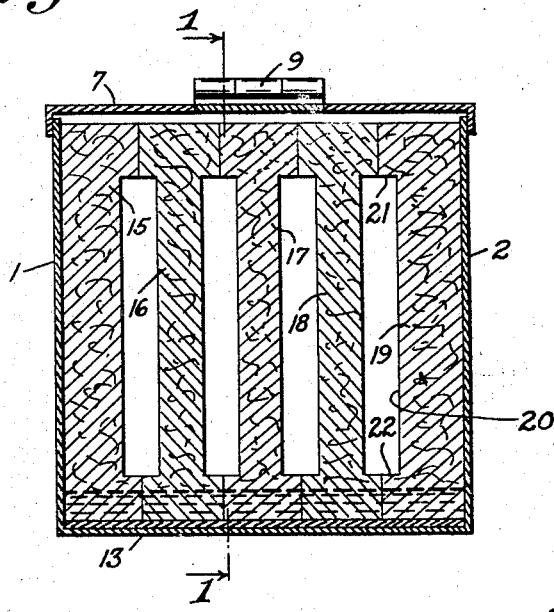
J. G. Quinlivan
Inventor Patented June 29, 1937

2,085,390

UNITED STATES PATENT OFFICE 2,085,390

AIR COOLER AND HUMIDIFIER

James G. Quinlivan, Dickinson, N. Dak.

Application November 4, 1936, Serial No. 109,178

4 Claims. (Cl. 261—104)

This invention relates to an air cooler and humidifier that may be constructed on a scale small enough to be readily portable or which may be constructed on a larger scale for permanent installation, the invention having for its object a construction which is simple in parts and less costly to manufacture and operate than those heretofore proposed.

With these and other objects in view the invention resides in the novel details of construction and combinations of parts more fully described hereinafter and particularly pointed out in the claims.

Referring to the accompanying drawing forming a part of this specification and in which like numerals designate like parts in all the views,—

Fig. 1 is a vertical sectional view of the device taken as on the line 1—1 of Fig. 2 and looking in the direction of the arrows; and Fig. 2 is a vertical transverse sectional view of said device taken as on the line 2—2 of Fig. 1 and looking in the direction of the arrows.

The invention comprises a box-like container having the two vertical side walls 1 and 2, an end wall 3 provided with the opening 4 therein, and another end wall 5 provided with the opening 6 therein which last mentioned opening is preferably the intake for the air to be cooled and humidified. A lid 7 is provided for the container having conveniently disposed therein a water inlet closed as by the door 8 hinged as at 9.

Adjacent the air intake 6 there is shown an electric motor 10 carrying the air impeller blades 11, said motor being supported as by the bracket 12 secured to the base or floor 13 of the container. Extending upwardly from the floor 13 is a retaining wall 14 extending substantially across the width of the container and suitably perforated to permit the passage of water therethrough. A plurality of porous absorbent units is provided, indicated by the numerals 15, 16, 17, 18 and 19, each unit of a length to fit between the retaining wall 14 and the air discharge end 3 of the container, and of a heighth substantially equal to that of the container.

Each unit is of substantially rectangular form, with a longitudinally extending channel or recess such as indicated by the numeral 20 formed in the face thereof adjacent another unit. In other words, each of the two extreme side units 15 and 19 will have only one recess formed therein, whereas each of the intermediate units 16, 17 and 18 will have similar recesses on their opposite faces all as clearly indicated in Fig. 2. These recesses form an upper shoulder as indicated at 21 and a lower shoulder 22, each formed perpendicularly to the face of the unit, and the recesses are so positioned that, when the units are assembled as shown, the shoulders will be in registry and thereby form a plurality of passageways for the air from the intake opening to the discharge opening.

The openings in the end walls are spaced above the floor a distance sufficient to provide an appreciable reservoir for water indicated at 25, said water being added as required by raising the door 8 in the lid 7, and the recesses such as 20 are positioned in the face of the units sufficiently far from the bottom edge thereof so that no free water will be within said recesses.

Each unit is of absorbent material, which may be more or less cellular so as to be porous, and capable of producing high capillary attraction so that the water may extend well up into each unit. Various materials are well known as having these qualities and therefore it is not desired to be limited to any particular one but the following may be stated as suitable,—fibrous material including wood and vegetable matter, fabric of textile nature, bats of textile fiber fabrication, and certain clays.

It is to be particularly observed that the several absorbent units are in appreciable surface contact with each other at the top and bottom of the container, and that the thickness of a unit is appreciable. The reason for this is to create a substantial filling of the container with absorbent material, with a resultant maximum of contained moisture so that the air impelled through the device will not quickly dry the surfaces of the air passages formed by the recesses such as 20. If desired a sheet of felt may be interposed between the units and the floor of the container to serve as a cushion.

It is obvious that those skilled in the art may vary the details of construction and arrangements of parts without departing from the spirit of this invention and therefore it is not desired to be limited to the exact foregoing disclosure except as may be demonstrated by the claims.

What is claimed is:

1. In a device of the character described the combination of a container provided with an air intake at one end and an air discharge at the opposite end thereof; means for creating a stream of air through the container; and a plurality of moisture containing units disposed in the air stream, said units being in contacting relation with each other at their top and bottom portions, each unit provided with a vertically walled recess in a side facing an adjacent unit, each recess coextensive with the unit in a direction from the air intake to the air discharge to form an unobstructed passage for the air stream.

2. In a device of the character described the combination of a container provided with an air intake at one end and an air discharge at the opposite end thereof; means for creating a stream of air through the container; and a plurality of moisture containing units disposed in the air stream, said units being in contacting relation with each other at their top and bottom portions, each unit provided with a vertically walled recess in a side facing an adjacent unit, each recess extending from the top portion to the bottom portion of its unit and coextensive with the unit in a direction from the air intake to the air discharge to form an unobstructed passage for the air stream.

3. In a device of the character described the combination of a container provided with an air intake at one end and an air discharge at the opposite end thereof; means for creating a stream of air through the container; and a plurality of moisture containing units disposed in the air stream, said units being in contacting relation with each other at their top and bottom portions, each unit provided with a vertically walled recess in the side facing an adjacent unit, each recess extending from the top portion to the bottom portion of its unit and in registry with the recess of the next adjacent unit, each recess coextensive with its unit in a direction from the air intake to the air discharge to form with a registering recess an unobstructed passage for the air stream.

4. In a device of the character described the combination of a container provided with an air intake at one end and an air discharge at the opposite end thereof; means for creating a stream of air through the container; and a plurality of moisture exuding units disposed in the air stream, said units having flat surfaces in contacting relation with each other, each contacting surface having a single air conducting recess formed therein extending substantially from top to bottom thereof and coextensive with the unit in a direction from the air intake to the air discharge.

JAMES G. QUINLIVAN.